United States Patent
Shimoi

(10) Patent No.: US 9,249,868 B2
(45) Date of Patent: Feb. 2, 2016

(54) CONTACT AND SEPARATING DEVICE AND IMAGE FORMING APPARATUS

(71) Applicant: CANON KABUSHIKI KAISHA, Tokyo (JP)

(72) Inventor: Yasuhiro Shimoi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/325,804

(22) Filed: Jul. 8, 2014

(65) Prior Publication Data

US 2015/0018169 A1 Jan. 15, 2015

(30) Foreign Application Priority Data

Jul. 10, 2013 (JP) ................................. 2013-144165

(51) Int. Cl.
*F16H 13/04* (2006.01)
*G03G 15/14* (2006.01)
*G03G 15/01* (2006.01)

(52) U.S. Cl.
CPC ............ *F16H 13/04* (2013.01); *G03G 15/0136* (2013.01)

(58) Field of Classification Search
CPC ................ G03G 15/0136; G03G 2215/00409; G03G 2215/0183; G03G 2215/0193; F16H 13/04
See application file for complete search history.

(56) References Cited

U.S. PATENT DOCUMENTS

| 2007/0253730 A1* | 11/2007 | Matsubara | G03G 15/1685 399/121 |
| 2009/0003877 A1* | 1/2009 | Miura | G03G 15/0131 399/121 |
| 2010/0260512 A1* | 10/2010 | Imamura | G03G 15/0131 399/66 |

FOREIGN PATENT DOCUMENTS

JP 2006-113283 A 4/2006

\* cited by examiner

*Primary Examiner* — Clayton E LaBalle
*Assistant Examiner* — Victor Verbitsky
(74) *Attorney, Agent, or Firm* — Fitzpatrick, Cella, Harper & Scinto

(57) ABSTRACT

A contact and separating device includes a roller member disposed to be capable of being contacted to an abutted member, a bearing member supporting the roller member and configured to be movable together with the roller member in a contact and separation direction with respect to the abutted member, and a biasing member biasing the roller member toward the abutted member through the bearing member. The contact and separating device further includes a separation member holding the roller member and the abutted member in a separation state where the roller member is separated from the abutted member against a biasing force of the biasing member by engaging with the bearing member in the separation state, and a release member releasing engagement between the bearing member and the separation member by moving the separation member.

12 Claims, 9 Drawing Sheets

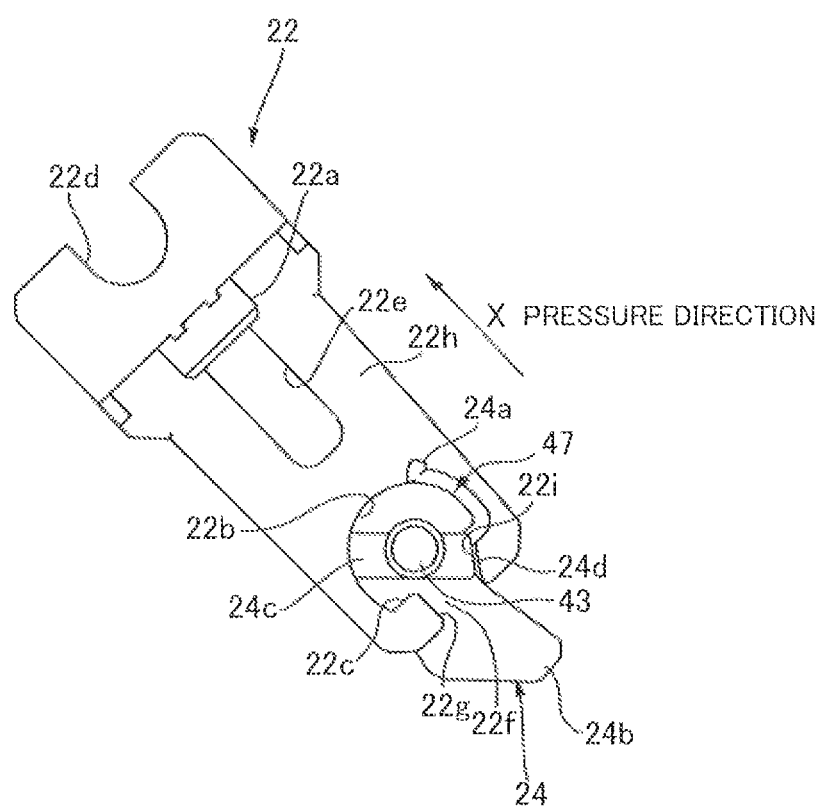

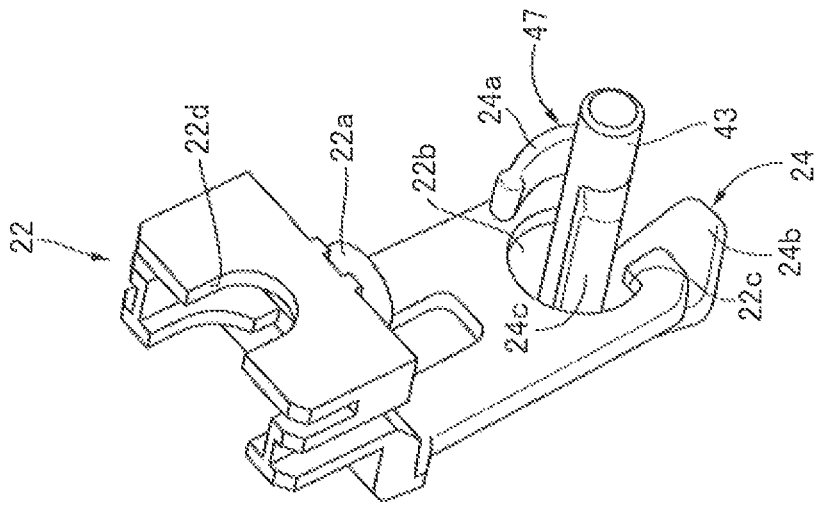
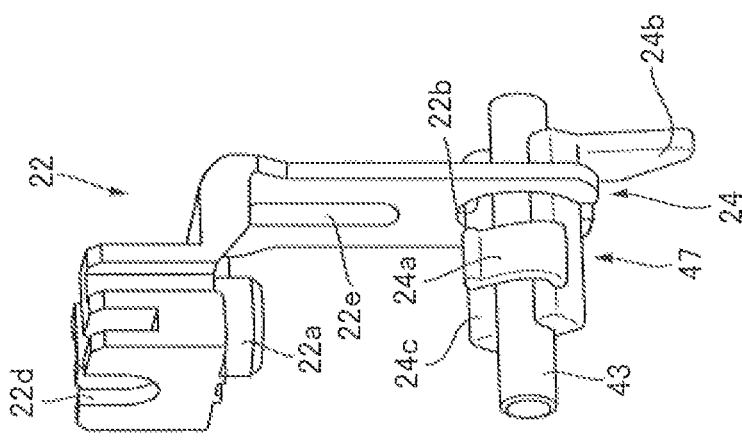
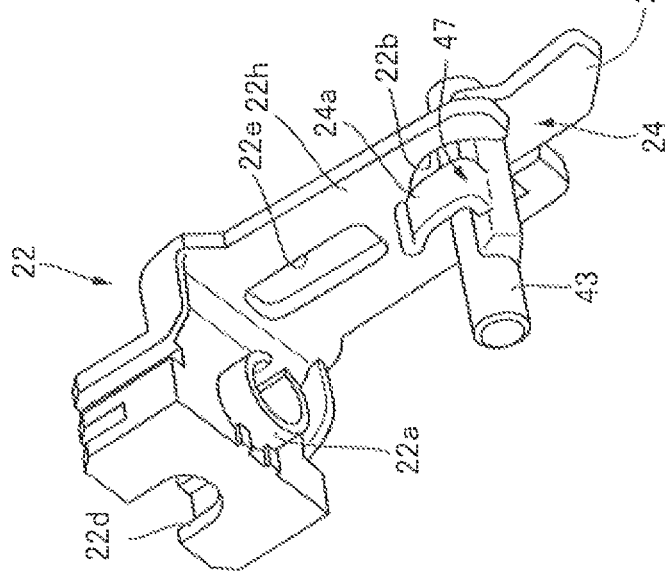

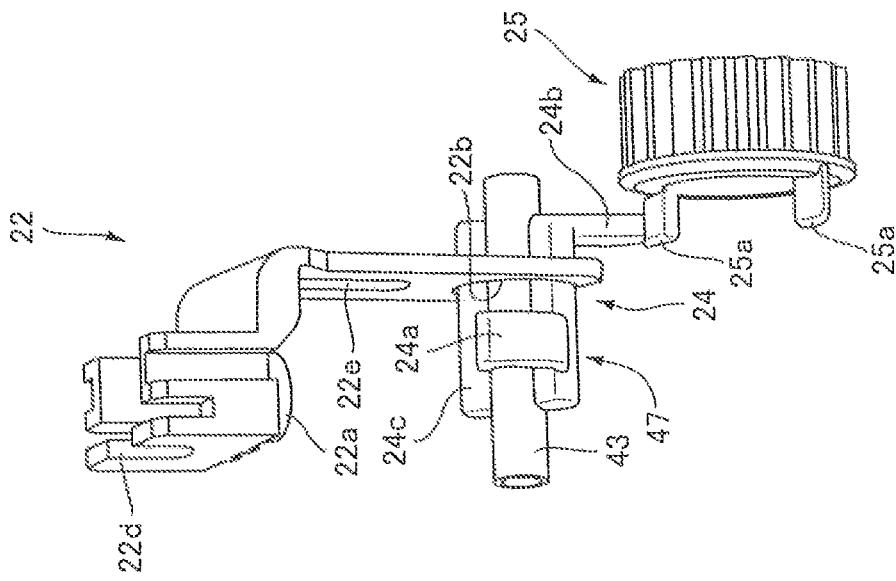
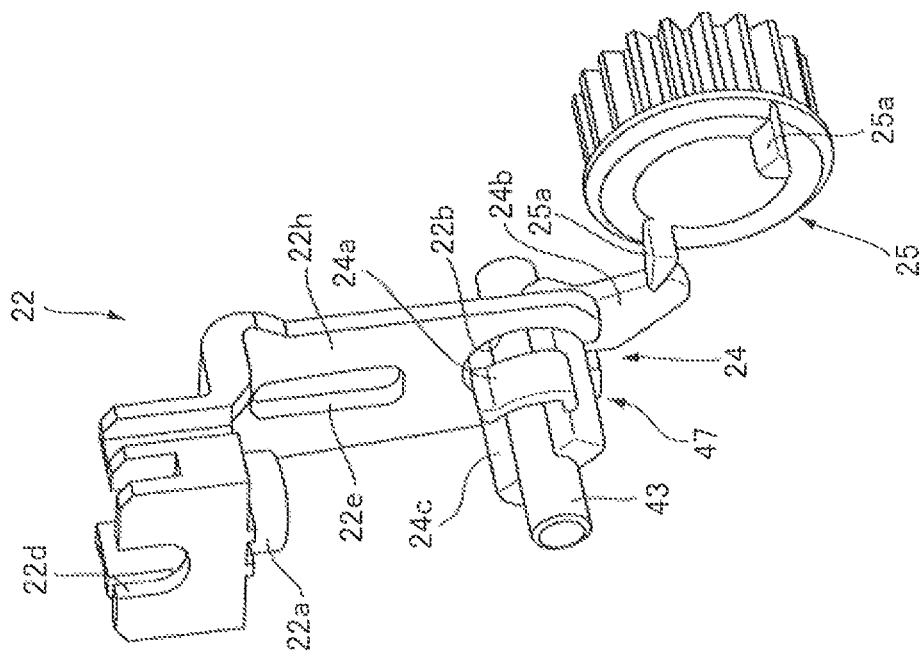

CONTACT AND SEPARATING DEVICE AND IMAGE FORMING APPARATUS

BACKGROUND OF THE INVENTION

1. Field of the Invention

The present invention relates to a contact and separating device that enables contact and separation between an abutted member such as an intermediate transfer belt and a roller member such as a transfer roller, and an image forming apparatus including the contact and separating device.

2. Description of the Related Art

Hitherto, an apparatus using an intermediate transfer belt and a transfer roller is well known as an electrophotographic image forming apparatus. The image forming apparatus is in an unused state for a long period of time until reaching an end user from the shipment thereof. In particular, the apparatus is often placed in a harsh environment such as a high-temperature and humidity environment during the transportation thereof. When the image forming apparatus is not used for a long period of time in such a state, the transfer roller is placed for a long period of time in a state where the transfer roller is pressed and welded into the intermediate transfer belt, and thus there is a concern of an image being disturbed by the attachment of an exuding material to the surface of the intermediate transfer belt.

In addition, the local deformation of the transfer roller may cause defective transfer. For this reason, a shipment configuration may be adopted in which the intermediate transfer belt and the transfer roller are set to be in a light-pressure state or a separation state by interposing a sheet-shaped member between the intermediate transfer belt and the transfer roller or inserting a separation member into the transfer roller side. In addition, as disclosed in JP-A-2006-113283, a configuration is proposed in which separation is released by using a driving gear being transmitted to a secondary transfer outer roller during an initial startup, from the viewpoint of improving serviceability and preventing an operational error due to forgotten removal or the like.

However, in the configuration disclosed in JP-A-2006-113283, the meshing of the driving gear with a transmitted gear of a secondary transfer roller even after release is a precondition, and thus the driving gear meshes with the transmitted gear even in a separation state. For this reason, a sufficient amount of separation cannot be secured between both of the gears, and thus it is difficult to sufficiently separate the secondary transfer roller from the intermediate transfer belt. Accordingly, there is a concern that exudation from the secondary transfer roller onto the surface of the intermediate transfer belt and the local deformation of the secondary transfer roller may not be avoided. In addition, the configuration cannot be adopted in a system in which a secondary transfer outer roller rotates in a driven manner.

SUMMARY OF THE INVENTION

According to an aspect of the present invention, there is provided a contact and separating device including a roller member which is disposed so as to be capable of being contacted to and separated from an abutted member, a bearing member which supports the roller member and is movable together with the roller member in a contact and separation direction with respect to the abutted member, a biasing member which biases the roller member toward the abutted member through the bearing member, a separation member which engages with the bearing member in a separation state where the roller member is separated from the abutted member against a biasing force of the biasing member to thereby hold the roller member and the abutted member in the separation state, and a release member which releases engagement between the bearing member and the separation member by moving the separation member by the driving thereof.

Further features of the present invention will become apparent from the following description of exemplary embodiments (with reference to the attached drawings).

BRIEF DESCRIPTION OF THE DRAWINGS

FIG. 3 is a schematic diagram showing a separation release operation of a bearing member of the contact and separating device according to the first embodiment.

FIG. 4A is a perspective view of the bearing member according to the first embodiment.

FIG. 4B is a perspective view of the bearing member when viewed from an angle different from that in FIG. 4A.

FIG. 4C is a perspective view of the bearing member when viewed from an angle different from that in FIG. 4A.

FIG. 5A is a perspective view of the contact and separating device.

FIG. 5B is a perspective view of the contact and separating device when viewed from an angle different from that in FIG. 5A.

DESCRIPTION OF THE EMBODIMENTS

<First Embodiment>

Figure 1:
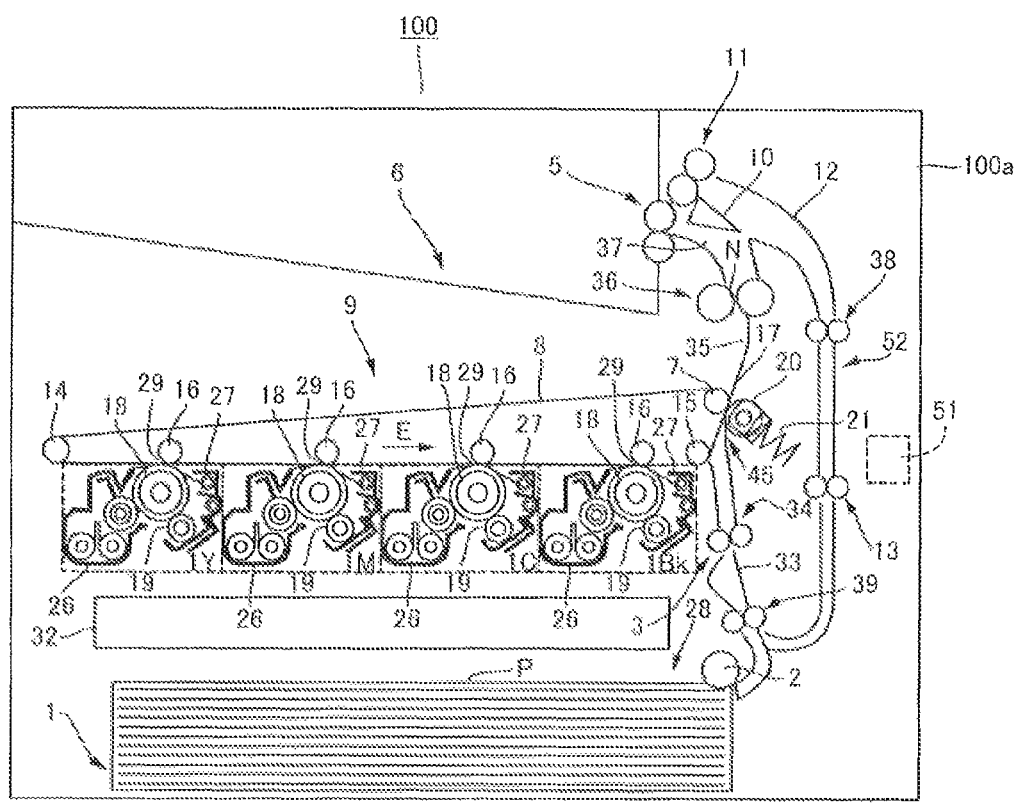
FIG. 1 is a cross-sectional view showing the entire configuration of an image forming apparatus according to a first embodiment of the present invention.

Hereinafter, an embodiment of an image forming apparatus 100 having a contact and separating device 45 mounted thereto according to the present invention will be described with reference to the accompanying drawings. Meanwhile, the same reference numbers and signs denote the same or corresponding portions through the drawings. FIG. 1 is a schematic cross-sectional view showing a schematic configuration of the image forming apparatus 100 such as a tandem type full color digital printer of an intermediate transfer system in this embodiment.

As shown in FIG. 1, the image forming apparatus 100 includes an apparatus main body 100a. The image forming apparatus 100 performs an imaging operation based on image information which is input from an external host device (not shown) which is connected to a control unit (not shown) so as to be capable of communicating therewith, and forms a full color image on a recording medium and outputs the image. The external host device means a computer, an image reader, or the like.

The apparatus main body 100*a* includes image forming portions 1Y, 1M, 1C, and 1Bk provided in a central portion within the apparatus main body 100*a*, a paper feeding unit 28 provided in a lower portion within the apparatus main body 100*a*, a conveyance section 52, and an ejection tray 6 provided in an upper portion of the apparatus main body 100*a*.

An intermediate transfer belt unit 9 including an endless flexible intermediate transfer belt 8 is disposed above the image forming portions 1Y, 1M, 1C, and 1Bk. The intermediate transfer belt 8 is stretched so as to be wound around a secondary transfer inner roller 7, a tension roller 14, and an extension roller 15, and rotates at a predetermined speed in a counterclockwise direction (direction of an arrow E) of FIG. 1 by the driving of the secondary transfer inner roller 7.

A secondary transfer outer roller 20 as a roller member and a contact and separating device 45 including the secondary transfer outer roller 20 are disposed on the opposite side to the secondary transfer inner roller 7 with the intermediate transfer belt 8 interposed therebetween. The secondary transfer outer roller 20 constitutes a transfer roller that transfers an image to a recording medium P from the intermediate transfer belt 8.

The contact and separating device 45 includes the secondary transfer outer roller 20 as a roller member, a bearing member 22, a transfer coil spring 21 as a biasing member, a separation member 24 (see FIG. 2), and a release member 25 (see FIG. 2). The release member 25 moves the separation member 24 by being driven to thereby release engagement between the bearing member 22 and the separation member 24.

The secondary transfer outer roller 20 is disposed so as to be capable of being contacted to and separated from the intermediate transfer belt 8 as an abutted member. In addition, a secondary transfer portion 17 is formed by an abutting portion (nip portion) between the intermediate transfer belt 8, which is wound around the secondary transfer inner roller 7, and the secondary transfer outer roller 20 which is pressed and welded into the intermediate transfer belt.

The image forming portions 1Y, 1M, 1C, and 1Bk forming an image in the intermediate transfer belt 8 as an abutted member are disposed in a row at predetermined intervals along a belt rotation direction on the lower side of the intermediate transfer belt 8. Each of the image forming portions 1Y to 1Bk is constituted by an electrophotographic process mechanism of a laser exposure system. Each of the image forming portions 1Y to 1Bk includes a photoconductive drum 18 which rotates at a predetermined speed in a clockwise direction of an arrow.

A charging roller 19 charging the photoconductive drum 18, a developing unit 26, a primary transfer roller 16, and a drum cleaner device 27 are disposed in the vicinity of each of the photoconductive drums 18. Meanwhile, in this embodiment, the abutted member according to the present invention is applied to the intermediate transfer belt 8, and the roller member is applied to the secondary transfer outer roller 20. However, the present invention is not limited to this configuration, and it is also possible to apply the abutted member according to the present invention to the photoconductive drum 18 and to apply the roller member to the charging roller 19.

Each primary transfer roller 16 is disposed on the inner side of the intermediate transfer belt 8, and is pressed and welded into the photoconductive drum 18 opposed thereto through a descending side belt portion of the intermediate transfer belt 8. A primary transfer portion 29 is constituted by an abutting portion between each photoconductive drum 18 and the intermediate transfer belt 8.

A laser exposure unit 32 corresponding to the photoconductive drum 18 of each image forming portion is disposed below the image forming portions 1Y, 1M, 1C, and 1Bk. The laser exposure unit 32 is constituted by a laser emitting portion, which performs light emission corresponding to a time-series electrical digital pixel signal of given image information, a polygon mirror, a reflecting mirror, and the like.

In addition, the paper feeding unit 28 includes a paper feeding cassette 1 in which recording media P having various sizes are loaded and accommodated, and a paper feeding roller 2 which is disposed corresponding to the paper feeding cassette 1.

The above-described control unit (not shown) causes each of the image forming portions 1Y, 1M, 1C, and 1Bk to perform imaging, on the basis of a color separation image signal which is input from the external host device. Thus, the image forming portions 1Y, 1M, 1C, and 1Bk form yellow, magenta, cyan, and black color toner images at a predetermined control timing on the surfaces of the rotating photoconductive drums 18. Meanwhile, the electrophotographic imaging principle and process of forming a toner image in the photoconductive drum 18 are well known, and thus the description thereof will be omitted.

The primary transfer portion 29 sequentially transfers the toner images formed on the surfaces of the photoconductive drums of the image forming portions in an overlapping manner to the outer surface of the intermediate transfer belt 8, which rotates in a forward direction with respect to the rotation direction of the photoconductive drum 18 and at a speed corresponding to the rotational speed of the photoconductive drum 18. Thus, unfixed full color toner images, due to the above-described four toner images being superposed on the surface of the intermediate transfer belt 8, are synthesized.

On the other hand, the paper feeding roller 2 corresponding to the paper feeding cassette 1 rotates at a predetermined paper-feeding timing. Thus, one recording medium P loaded and accommodated in the paper feeding cassette 1 is separated and fed, and is then conveyed to a registration roller 34 via a vertical conveyance path 33 of a conveyance section 52.

The registration roller 34 timing-conveys the recording medium P so that a tip portion of the recording medium P reaches the secondary transfer portion 17 in accordance with a timing when a tip of the full color toner image on the rotating intermediate transfer belt 8 reaches the secondary transfer portion 17. Thus, the secondary transfer of the full color toner images on the intermediate transfer belt 8 is sequentially performed on the surface of the recording medium P collectively by the secondary transfer portion 17.

The recording medium P having passed through the secondary transfer portion 17 is separated from the surface of the intermediate transfer belt, is guided to the vertical guide 35 of the conveyance section 52, and is then introduced into a fixing nip portion N of the fixing unit 36. The full color toner images are melted and mixed, and are then fixed as fixed images onto the surface of the recording medium P by the fixing unit 36. The recording medium P having left the fixing unit 36 passes through a conveyance path 37 as a full color image formation, and is then discharged onto the ejection tray 6 by a paper ejection roller 5.

The surface of the intermediate transfer belt 8 after the recording medium P is separated by the secondary transfer portion 17 is cleaned by a belt cleaning unit (not shown), which is disposed so as to face the tension roller 14, upon the removal of residual attachments such as a secondary toner failed to be transferred, and is repeatedly used for imaging.

On the other hand, in a case of two-sided image formation, the conveyance path of the recording medium is switched by a switching member 10. The recording medium is conveyed by a reversing roller 11, is switch-back conveyed immediately after a back end of the recording medium passes through a bifurcation point, and is guided to a two-sided conveyance path 12. Then, the recording medium is conveyed again to the secondary transfer portion 17 by conveyance rollers 38 and 13 and a conveyance roller 39 during duplex printing. After an image is formed on the rear surface of the recording medium, the recording medium passes through the fixing unit 36 and is finally discharged onto the ejection tray 6, thereby terminating a series of image forming operations.

A drive source 51 rotating the conveyance rollers 38 and 13 is disposed in the apparatus main body 100a. The drive source 51 is connected to a rotation axis of the release member 25 through a transmission mechanism, not shown in the drawing, so as to be also capable of rotating the release member 25, to be described later, in addition to the rotation of the rollers. Accordingly, since the drive source 51 of the conveyance rollers 38 and 13 can be shared, it is possible to simplify the configuration without having to separately provide a drive source of the release member 25.

Figure 2A:
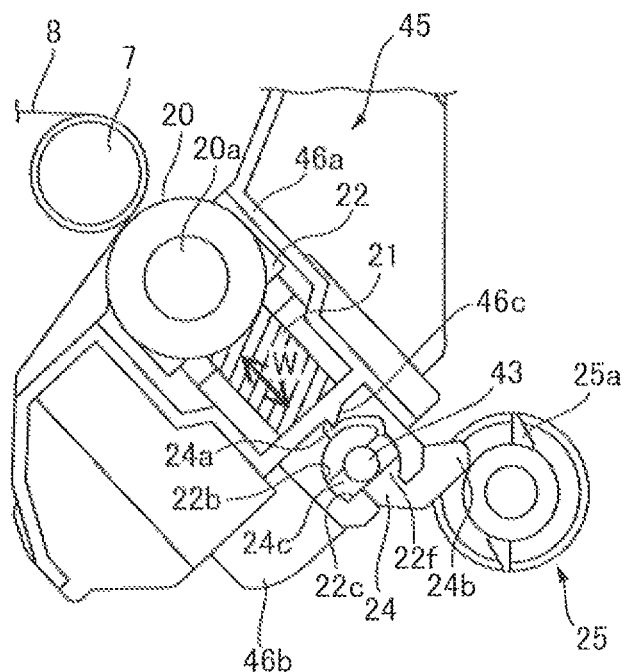
FIG. 2A is a schematic diagram showing a contact and separating device in a separation state.
Figure 2B:
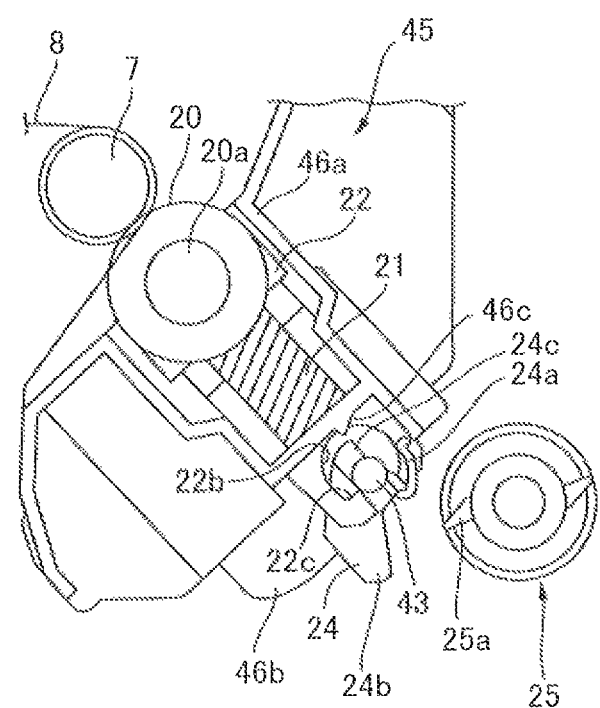
FIG. 2B is a schematic diagram showing the contact and separating device in a separation release state.

Next, a configuration in the vicinity of the transfer roller according to this embodiment will be described with reference to FIGS. 2A and 2B to FIG. 5. Meanwhile, FIGS. 2A and 2B show the contact and separating device 45 according to this embodiment. FIG. 2A is a schematic diagram showing a separation state of the contact and separating device 45, and FIG. 2B is a configuration diagram showing a separation release state of the contact and separating device 45. FIG. 3 is a configuration diagram showing a separation release operation of the bearing member 22 according to this embodiment, and FIGS. 4A to 4C and FIGS. 5A and 5B are perspective views showing the bearing member 22 by a different viewing angle.

That is, as shown in FIGS. 2A and 2B, bearing supporting portions 46a and 46b are provided on the apparatus main body 100a side, and the bearing supporting portions 46a and 46b support the bearing member 22 so as to be capable of being contacted to and separated from the intermediate transfer belt 8 as an abutted member. In a state where the bearing member 22 supports the secondary transfer outer roller 20, the bearing member 22 is configured to be movable together with the secondary transfer outer roller 20 in a contact and separation direction (direction of an arrow W of FIG. 2A) with respect to the intermediate transfer belt 8.

The secondary transfer outer roller 20 supported by the bearing member 22 is biased by the transfer coil spring 21 as a biasing portion so as to have a predetermined abutting pressure against the intermediate transfer belt (abutted member) 8 and the secondary transfer inner roller 7. In this manner, the transfer coil spring 21 biases the secondary transfer outer roller 20 toward the intermediate transfer belt 8 through the bearing member 22.

Meanwhile, the secondary transfer outer roller 20 is configured using an iron metal cored bar (not shown) as a cored bar and a semiconductive sponge (not shown) consisting primarily of an NBR Hydrin rubber as an elastic layer.

As shown in FIGS. 2A and 2B and FIG. 3, one end and the other end of the transfer coil spring 21 are supported between a boss 22a in the bearing member 22 and a boss (not shown) which protrudes from a bearing surface (not shown) of the bearing supporting portion 46b. Thus, the transfer coil spring 21 of which the upper and lower ends are fixedly held biases the secondary transfer outer roller 20 of which the rotation axis 20a is supported by a bearing concave portion 22d formed in an upper portion of the bearing member 22 toward the intermediate transfer belt 8. The bearing member 22 is disposed so as to be slidable only in the contact and separation direction (direction of the arrow W) in portions constituting the bearing surfaces of the bearing supporting portions 46a and 46b, and is constrained by the bearing supporting portions 46a and 46b in other directions.

As shown in FIG. 3, the bearing member 22 includes a circular guiding portion 22b which rotatably guides and supports the separation member 24 in an end on the opposite side to the bearing concave portion 22d, that is, in a portion on the opposite side to a pressure direction (biasing direction) X of the bearing member 22. Further, the bearing member 22 includes a bearing side engagement portion 22c.

The bearing supporting portion 46a is provided with a supporting portion side engagement portion 46c, which prevents a separation side engagement portion 47 (see FIG. 3) from rotating in a predetermined direction (clockwise direction of FIG. 2A) by engaging with a first engagement portion 24a. That is, the first engagement portion 24a regulates the rotation of the separation member 24 in a direction of the predetermined position in the separation state by engaging with a supporting portion side engagement portion 46c provided in a bearing supporting portion 46a supporting the bearing member 22 to be movable in the contact and separation direction.

The bearing side engagement portion 22c engages with a second engagement portion 24c in a separation state, and allows the separation side engagement portion 47 to rotate in a predetermined direction (clockwise direction of FIG. 2A) when the engagement between the first engagement portion 24a and the supporting portion side engagement portion 46c is released. The engagement between the bearing side engagement portion 22c and the second engagement portion 24c of the separation side engagement portion 47 is released when the separation side engagement portion 47 rotates to be set to be located at a predetermined position (position of FIG. 2B), thereby causing the bearing member 22 to be movable toward the intermediate transfer belt 8.

The circular guiding portion 22b includes a portion having a circular inner circumference and a linear notch portion 22f extending to the opposite side to the pressure direction from the circular portion. A boundary portion between the circular portion and the notch portion 22f of the circular guiding portion 22b is formed as a chamfer or an inclined portion of a corner R. In addition, the bearing supporting portion 46b (see FIGS. 2A and 2B) holds the separation member 24 which is rotatable on an axis parallel to the secondary transfer outer roller 20, in the vicinity of the circular guiding portion 22b of the bearing member 22.

The bearing member 22 includes the above-described notch portion 22f which is formed adjacent to the bearing side engagement portion 22c. When the separation side engagement portion 47 including the first engagement portion 24a and the second engagement portion 24c rotates to be set to be located at a predetermined position (position shown in FIG. 2B), the notch portion 22f allows the second engagement portion 24c to escape in the opposite direction to the pressure direction X of the transfer coil spring 21. The second engagement portion 24c has an inclined portion that connects the circular guiding portion 22b and the notch portion 22f at the chamfer or the corner R.

Further, the bearing member 22 includes a regulation portion 22g (FIG. 3) which regulates the rotation of the separation side engagement portion 47 at a predetermined position. A flat portion 22h formed to be bent from the bearing concave portion 22d is provided with a longitudinal through hole portion 22e which passes through the front and back of the bearing member 22. The diameters of the circular guiding portion 22b of the bearing member 22 and the second engagement portion 24c of the separation member 24 are set so that a fitting relationship is established to be [JIS fitting of approximately H10/f10, H9/f9, and H8/f8].

The release member 25, which rotates independently of the rotation of the secondary transfer outer roller 20, is placed at a position facing the separation member 24. As shown in FIG. 3 to FIGS. 5A and 5B, the separation member 24 engages with the bearing member 22 in a separation state where the secondary transfer outer roller 20 is separated from the intermediate transfer belt 8 against a biasing force of the transfer coil spring 21 to thereby hold the secondary transfer outer roller 20 and the intermediate transfer belt 8 in the separation state. The separation member 24 moves to a position where a release state is maintained, regardless of the driving of the release member 25, by releasing the engagement with the bearing member 22 by the release member 25.

As described above, the release member 25 is driven by the drive source 51 which rotates the conveyance rollers 38 and 13, causes a claw-shaped releasing engagement portion 25a rotating in the counterclockwise direction of FIG. 2A to engage with a released engagement portion 24b, and rotates the separation member 24 in the release direction (clockwise direction of FIG. 2A). A pair of releasing engagement portions 25a is configured to protrude in two directions perpendicular to the rotation center.

The separation member 24 includes the separation side engagement portion 47, having the first engagement portion 24a and the second engagement portion 24c, which is rotatably supported together with the released engagement portion 24b by the bearing supporting portions 46a and 46b. The separation member 24 includes a shaft 43 capable of passing through the circular guiding portion 22b, in the center thereof. The shaft 43 of the separation member 24 is rotatably supported by the bearing supporting portions 46a and 46b sides.

The first engagement portion 24a is a member, having flexibility, which extends in the form of an arc so as to be directed in a counterclockwise direction from one end (right ends of FIG. 2A and FIG. 3) of the second engagement portion 24c. More specifically, the first engagement portion 24a is configured to be capable of being elastically deformed such that the first engagement portion 24a moves over the supporting portion side engagement portion 46c and releases the engagement with the supporting portion side engagement portion 46c in response to the separation member 24 rotated by the release member 25 in the separation state. The second engagement portion 24c protrudes in a radial direction from the axial central portion of the shaft 43. The separation member 24 includes the released engagement portion 24b which protrudes in the form of an arm downward from the end of the shaft 43 and which engages with the claw-shaped releasing engagement portion 25a.

Hereinafter, a description will be made with a focus on the operation of the contact and separating device 45 according to this embodiment which has the above-described configuration.

<Separation State>

First, the secondary transfer outer roller 20 is in a separation state where the secondary transfer outer roller is moved to the opposite side to the pressure direction X up to a light-pressure position or a non-contact position with respect to the intermediate transfer belt 8 and is held (FIG. 2A). In this separation state, the circular guiding portion 22b of the bearing member 22 and the second engagement portion 24c of the separation member 24 are substantially coaxially located, and the separation member 24 rotates so that a linear portion of the second engagement portion 24c is substantially perpendicular to the pressure direction.

For this reason, the bearing side engagement portion 22c of the bearing member 22 engages with the second engagement portion 24c to thereby hold the separation member 24 so as not to rotate over a separation holding state, and the rotation of the first engagement portion 24a of the separation member 24 in the release direction of the separation member 24 is regulated by the supporting portion side engagement portion 46c. Thus, the engagement between the bearing side engagement portion 22c and the second engagement portion 24c is maintained to thereby hold the separation state.

<Release State>

In the above-described separation state, for example, when the image forming apparatus 100 which is carried in a packed state is set to be in an ordinary usage state and then the release member 25 rotates upon the driving of the drive source 51 by the application of a main power supply or the like, the following state is set.

That is, the claw-shaped releasing engagement portion 25a abuts against the arm-shaped released engagement portion 24b of the separation member 24 by the relatively slow rotation of the release member 25 in the counterclockwise direction of FIG. 2A. Thus, the separation member 24 is pushed in the release direction (clockwise direction of FIG. 2A) through the released engagement portion 24b, and the first engagement portion 24a moves over the supporting portion side engagement portion 46c by the flexibility thereof. Then, a balance between the engagement of the bearing side engagement portion 22c with the second engagement portion 24c and the biasing force of the transfer coil spring 21 is lost, and the separation member 24 rotates in a clockwise direction in a manner that the notch portion 22f passes through the second engagement portion 24c.

At this time, the linear portion of the second engagement portion 24c rotates up to an angle which is substantially parallel to the pressure direction (direction of an arrow X of FIG. 3) of the secondary transfer outer roller 20. Thus, the bearing member 22 moves in the pressure direction in a manner that the notch portion 22f passes through the second engagement portion 24c, and thus the separation state is released (see FIG. 2B). That is, as shown in FIG. 3, when the separation member 24 rotates up to the vicinity of the superposition of an inclined portion 24d on an inclined portion 22i of the bearing member 22, the separation member 24 rotates without abutting against the release member 25 by the biasing force of the transfer coil spring 21 when the notch portion 22f passes through the second engagement portion 24c.

At this time, even when the release member 25 continuously rotates in a state where the separation is released, the separation member 24 is set to be located at a position where the separation member does not come into contact with the release member 25. As described above, a separation release timing is consistent with the time of applying a power supply after the setting to the ordinary usage state, and thus it is possible to reliably prevent the occurrence of a paper jam and a defective image due to user's forgetting to remove a transfer pressure release member or the like as in the related art. In addition, there is no influence on the imaging operation due to the separation release operation. Thus, an ordinary usage state where the secondary transfer outer roller 20 abuts against the intermediate transfer belt 8 is set.

According to this embodiment described above, when the image forming apparatus 100 is not used for a long period of time from packing to conveyance, the secondary transfer outer roller 20 is separated from the intermediate transfer belt 8 by a simple configuration, and thus it is possible to reliably suppress a pressurizing force therebetween. In addition, the separation state can be automatically released by the rotating release member 25 by low torque without damaging the facing component, and thus it is possible to prevent disadvantages such as exudation (weeping) from the secondary transfer outer roller 20 and the occurrence of a defective image.

That is, a state where a regular transfer pressure is automatically applied can be set during an initial rotation at the time of applying a power supply, and thus it is possible to reliably prevent the occurrence of a paper jam and a defective image due to user's forgetting to remove the transfer pressure release member. In this manner, an arbitrary amount of separation is secured regardless of whether or not a roller member such as the secondary transfer outer roller 20 is a driving component or a driven component, and thus it is possible to solve the problems of exudation onto the surface of the intermediate transfer belt and the local deformation of the secondary transfer outer roller 20.

<Second Embodiment>

Figure 6A:
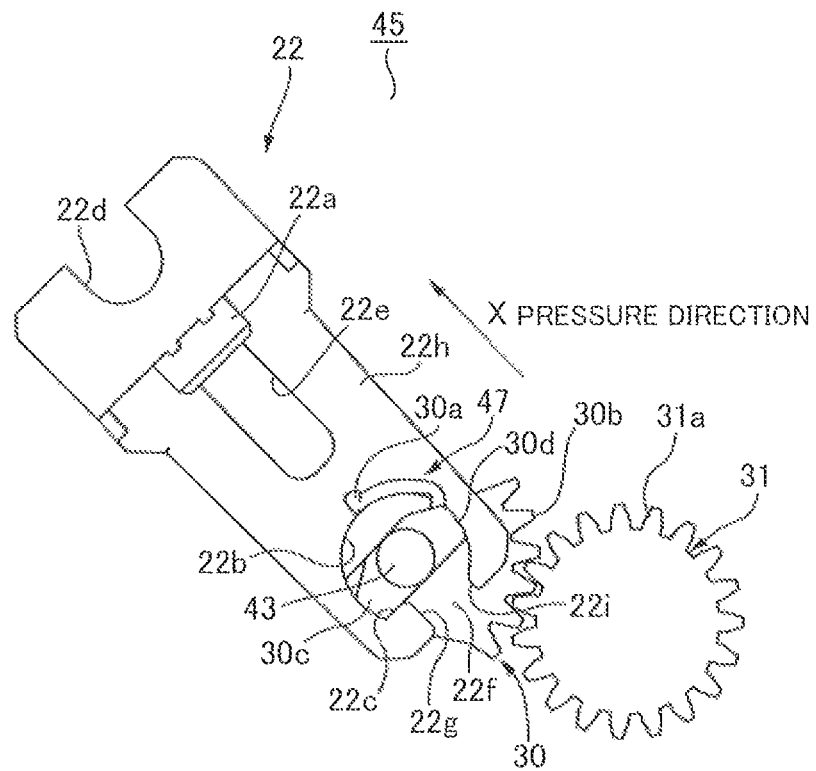
FIG. 6A is a diagram showing a separation state in a contact and separating device according to a second embodiment of the present invention.
Figure 6B:
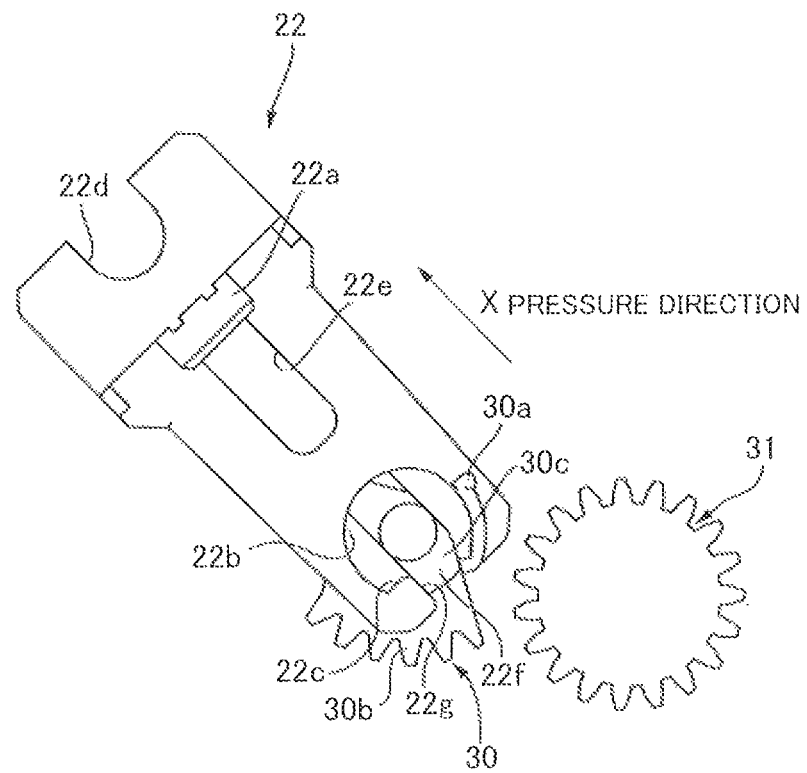
FIG. 6B is a diagram showing a separation release state in the contact and separating device according to the second embodiment of the present invention.
Figure 7:
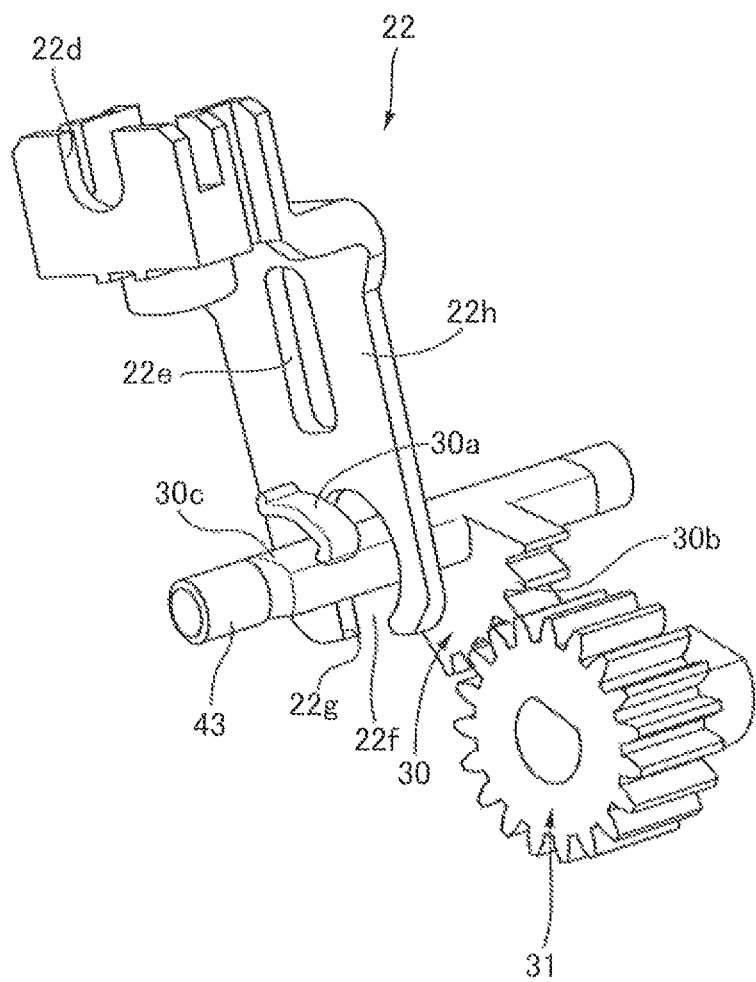
FIG. 7 is a configuration diagram showing the separation state of the contact and separating device according to the second embodiment by a different viewing angle.

Next, reference will be made to FIGS. 6A and, 6B and FIG. 7 to describe a second embodiment in which a configuration of the contact and separating device 45 in the first embodiment is partially changed. FIGS. 6A and 6B show a contact and separating device in this embodiment. FIG. 6A is a configuration diagram showing a separation state of the contact and separating device, and FIG. 6B is a configuration diagram showing a separation release state of the contact and separating device. FIG. 7 is a configuration diagram showing a separation state of the contact and separating device in this embodiment by a different viewing angle. Meanwhile, in the second embodiment, the same components as in the first embodiment will be denoted by the same reference numerals and signs, and the description thereof will be omitted.

That is, in this embodiment, as shown in FIGS. 6A and 6B and FIG. 7, a separation member 30 is rotatably fitted to a circular guiding portion 22b provided in a bearing member 22 having the same configuration as that in the first embodiment. A shaft 43 of the separation member 30 is rotatably supported by bearing supporting portions 46a and 46b sides.

The bearing supporting portion 46a is provided with a supporting portion side engagement portion 46c (see FIG. 2A) which prevents a separation side engagement portion 47 from rotating in a predetermined direction (clockwise direction of FIG. 6A) by engaging with a first engagement portion 30a.

The bearing side engagement portion 22c engages with a second engagement portion 30c in a separation state, and allows the separation side engagement portion 47 to rotate in a predetermined direction (clockwise direction of FIG. 6A) when engagement between the first engagement portion 30a and the supporting portion side engagement portion 46c is released. The engagement between the bearing side engagement portion 22c and the second engagement portion 30c of the separation side engagement portion 47 is released when the separation side engagement portion 47 rotates to be set to be located at a predetermined position (position of FIG. 6B), thereby causing the bearing member 22 to be movable toward an intermediate transfer belt 8. In addition, the bearing supporting portion 46b (see FIG. 2) holds the separation member 30 which is rotatable on an axis parallel to the secondary transfer outer roller 20 in the vicinity of the circular guiding portion 22b of the bearing member 22.

When the separation side engagement portion 47 including the first engagement portion 30a and the second engagement portion 30c rotates to be set to be located at a predetermined position (position of FIG. 6B), a notch portion 22f of the bearing member 22 allows the second engagement portion 30c to escape in the opposite direction to a pressure direction X of a transfer coil spring 21. The second engagement portion 30c has an inclined portion that connects the circular guiding portion 22b and the notch portion 22f at a chamfer or a corner R.

The diameters of the circular guiding portion 22b of the bearing member 22 and the second engagement portion 30c of the separation member 30 are set so that a fitting relationship is established to be [JIS fitting of approximately H10/f10, H9/f9, and H8/f8].

A release member 31, which rotates independently of the rotation of the secondary transfer outer roller 20, is placed at a position facing the separation member 30. As shown in FIGS. 6A and 6B and FIG. 7, the separation member 30 engages with the bearing member 22 in a separation state where the secondary transfer outer roller 20 is separated from the intermediate transfer belt 8 against a biasing force of the transfer coil spring 21 to thereby hold the secondary transfer outer roller 20 and the intermediate transfer belt 8 in the separation state. The separation member 30 moves to a position where a release state is maintained, regardless of the driving of the release member 31, by releasing the engagement with the bearing member 22 by the release member 31.

The gear-shaped release member 31 is driven by a drive source 51 (see FIG. 1) which rotates conveyance rollers 38 and 13. A tooth portion 31a as a releasing engagement portion which rotates in a counterclockwise direction of FIGS. 6A and 6B is caused to engage with a chipped tooth gear portion 30b to thereby rotate the separation member 30 in a release direction (clockwise direction of FIG. 2A). As described above, the release member 31 of this embodiment is configured to have a gear shape, and the tooth portion 31a of the release member 31 constitutes a releasing engagement portion. In this embodiment, the chipped tooth gear portion 30b of the separation member 30 which meshes with the tooth portion 31a constitutes a released engagement portion.

The separation member 30 in this embodiment includes the separation side engagement portion 47, having the first engagement portion 30a and the second engagement portion 30c, which is rotatably supported together with the chipped tooth gear portion 30b as a released engagement portion by the bearing supporting portions 46a and 46b. The separation member 30 includes a shaft 43 capable of passing through the circular guiding portion 22b, in the center thereof. The shaft 43 is rotatably supported by the bearing supporting portions 46a and 46b sides.

The first engagement portion 30a, having flexibility, extends in the form of an arc so as to be directed in a counterclockwise direction from one end of the second engagement portion 30c. The second engagement portion 30c protrudes in a radial direction from the axial central portion of the shaft 43. The separation member 30 includes the chipped tooth gear portion 30b as a released engagement portion. The chipped tooth gear portion protrudes in the form of an arm downward from the end of the shaft 43 and engages with the tooth portion 31a of the release member 31. In other words, the releasing engagement portion according to the present invention is configured as the tooth portion 31a of the release member 31 having a gear shape, and the released engagement portion is configured as the chipped tooth gear portion 30b of the separation member 30 which meshes with the tooth portion 31a.

Also in this embodiment, the drive source 51 of the conveyance rollers 38 and 13 is shared, and the release member 31 can rotate independently of the rotation of the secondary transfer outer roller 20, and thus it is possible to simplify the configuration without having to separately provide a drive source of the release member 31.

Hereinafter, a description will be made with a focus on the operation of the contact and separating device 45 according to this embodiment which has the above-described configuration.

<Separation State>

First, the secondary transfer outer roller 20 is in a separation state where the secondary transfer outer roller is moved to the opposite side to the pressure direction X up to a light-pressure position or a non-contact position with respect to the intermediate transfer belt 8 and is held (FIG. 6A). In this separation state, the circular guiding portion 22b of the bearing member 22 and the second engagement portion 30c of the separation member 30 are substantially coaxially located, and the separation member 24 rotates so that a linear portion of the second engagement portion 30c is substantially perpendicular to the pressure direction.

For this reason, the bearing side engagement portion 22c of the bearing member 22 engages with the second engagement portion 30c to thereby hold the separation member 30 so as not to rotate over a separation holding state. In addition, the rotation of the first engagement portion 30a of the separation member 30 in the release direction of the separation member 30 is regulated by the supporting portion side engagement portion 46c (see FIG. 2). Thus, the engagement between the bearing side engagement portion 22c and the second engagement portion 30c is maintained to thereby hold the separation state.

<Release State>

In the above-described separation state, for example, when the image forming apparatus 100 which is carried in a packed state is set to be in an ordinary usage state and then the release member 31 rotates upon the driving of the drive source 51 by the application of a main power supply or the like, the following state is set.

That is, the tooth portion 31a rotates while meshing with the chipped tooth gear portion 30b of the separation member 30 by the relatively slow rotation of the release member 31 in the counterclockwise direction of FIG. 6A. Thus, the separation member 30 rotates in the release direction (clockwise direction of FIG. 6A) through the chipped tooth gear portion 30b, and the first engagement portion 30a crosses over the supporting portion side engagement portion 46c by the flexibility thereof. Accordingly, a balance between the engagement of the bearing side engagement portion 22c with the second engagement portion 30c and the biasing force of the transfer coil spring 21 is lost, and the separation member 30 rotates in a clockwise direction in a manner that the notch portion 22f passes through the second engagement portion 30c.

At this time, when the linear portion of the second engagement portion 30c rotates up to an angle which is substantially parallel to the pressure direction (direction of an arrow X of FIG. 6B) of the secondary transfer outer roller 20, the bearing member 22 moves in the pressure direction in a manner that the notch portion 22f passes through the second engagement portion 30c. Thus, as shown in FIG. 6B, the separation state is released. That is, as shown in FIG. 6B, when the separation member 30 rotates up to the vicinity of the superposition of an inclined portion 30d on an inclined portion 22i of the bearing member 22, the notch portion 22f passes through the second engagement portion 30c. The separation member 30 rotates without abutting against the release member 31 by the biasing force of the transfer coil spring 21 at that time.

At this time, even when the release member 31 continuously rotates in a state where the separation is released, the separation member 30 is set to be located at a position where the separation member does not come into contact with the release member 31.

Also in this embodiment described above, substantially the same effects as in the first embodiment can be obtained.

<Third Embodiment>

Figure 8:
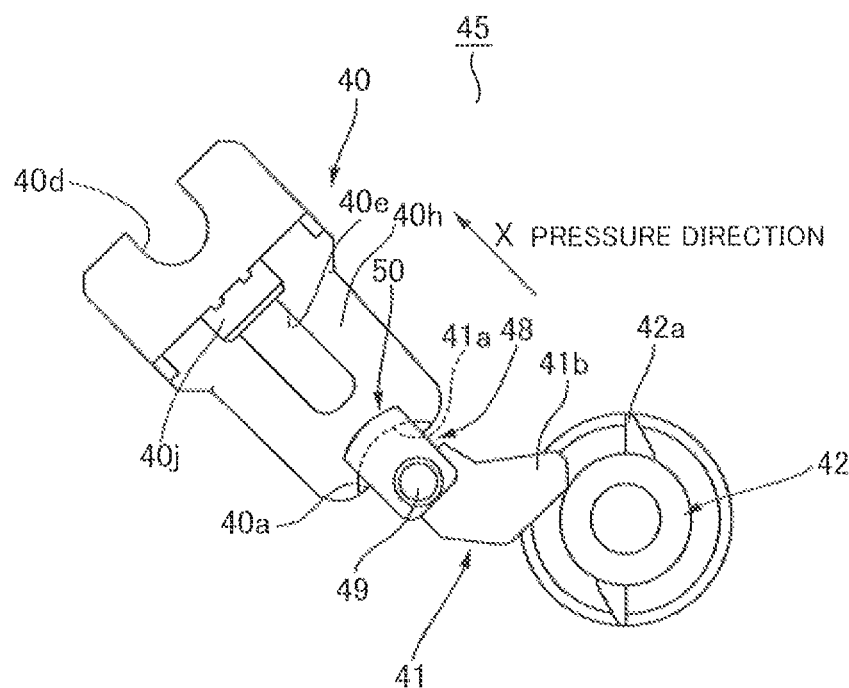
FIG. 8 is a configuration diagram showing a separation state of a contact and separating device according to a third embodiment of the present invention.
Figure 9A:
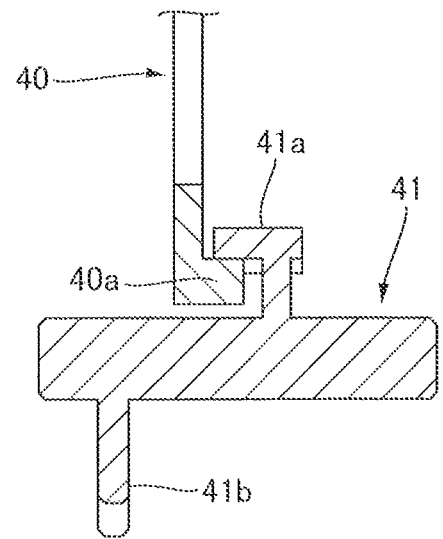
FIG. 9A is a cross-sectional view showing a state of engagement between a bearing member and a separation member in the separation state according to the third embodiment.
Figure 9B:
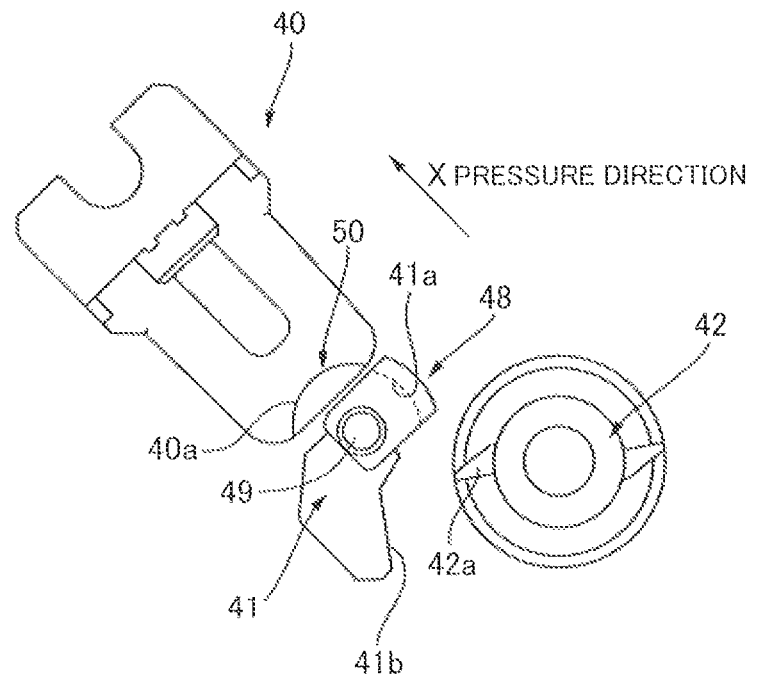
FIG. 9B is a configuration diagram showing a separation release state of the contact and separating device according to the third embodiment.

Next, a third embodiment to which the present invention is applied will be described with reference to FIG. 8 and FIGS. 9A and 9B. FIG. 8 is a configuration diagram showing a separation state of a contact and separating device in this embodiment. FIG. 9A is a cross-sectional view showing a state of engagement in a separation state in this embodiment, and FIG. 9B is a configuration diagram showing a separation release state of the contact and separating device. Meanwhile, also in this embodiment, the same components as in the first embodiment will be denoted by the same reference numerals and signs, and the description thereof will be omitted.

In this embodiment, a bearing member 40 includes a boss 40j, a bearing concave portion 40d, a through hole portion 40e, and a flat portion 40h which are the same as those of the bearing member 22 of the first embodiment, but does not include portions equivalent to the circular guiding portion 22b, the bearing side engagement portion 22c, and the like and a member equivalent to the separation member 24.

That is, in this embodiment, a separation side engagement portion 48 having a first curved surface 41a centered on a rotation center 49 is provided as a component that holds and releases the bearing member 40 in a separation state. Further, a bearing side engagement portion 50 having a second curved portion 40a is provided. The second curved portion engages with the first curved surface 41a in a separation state and is curved so as to allow the rotation of the separation side engagement portion 48.

The separation side engagement portion 48 includes a separation member 41. The separation member has the first curved surface 41a provided on the upper side from the rotation center 49 and a released engagement portion 41b extending downward from the rotation center 49. On the other hand, the bearing side engagement portion 50 having the second curved portion 40a is provided at a position facing the separation member 41 in the bearing member 40.

In addition, a release member 42 having the same configuration as that of the release member 25 of FIG. 2 is provided at a position facing the separation member 41 on the opposite side to the bearing member 40 so as to be rotatable by the driving of a drive source 51 (see FIG. 1). The release member 42 has a pair of claw-shaped releasing engagement portions 42a that protrude in two directions perpendicular to a rotation center.

An abutting pressure against the intermediate transfer belt 8 is applied to a secondary transfer outer roller 20 supported by the bearing concave portion 40d, by a transfer coil spring 21 (see FIG. 2A) through the bearing member 40. Bearing supporting portions 46a and 46b (see FIG. 2A) support the separation member 41 having an arc center of the first curved surface 41a coaxially with an arc center of the second curved portion 40a when the bearing member 40 is moved until reaching the separation state of FIG. 8.

In the contact and separating device 45 of this embodiment, the relation of (outer diameter of the second curved portion 40a) ≤(inner diameter of the first curved surface 41a) is established. In this embodiment, a release member 42 is placed on an axis of a conveyance roller 13.

Hereinafter, a description will be made with a focus on the operation of the contact and separating device 45 according to this embodiment which has the above-described configuration.

<Separation State>

First, the secondary transfer outer roller 20 is in a separation state where the secondary transfer outer roller is moved to the opposite side to the pressure direction X up to a light-pressure position or a non-contact position with respect to the intermediate transfer belt 8 and is held (FIG. 8). In this separation state, the separation member 41 rotates at the positions shown in FIG. 8 and FIGS. 9A and 9B to thereby cause the first curved surface 41a to engage with the second curved portion 40a of the bearing member 40. Thus, the engagement between the bearing side engagement portion 22c and the second engagement portion 30c is maintained to thereby hold the separation state.

<Release State>

In the above-described separation state, when the release member 42 rotates upon the driving of the drive source 51 by the application of a main power supply or the like, the following state is set. That is, the releasing engagement portion 42a pushes the released engagement portion 41b by the relatively slow rotation of the release member 42 in a counter-clockwise direction of FIG. 8. Thus, the separation member 41 rotates in the release direction (clockwise direction of FIG. 8), and the first curved surface 41a is separated from the second curved portion 40a to thereby release the separation state, and thus a state shown in FIG. 9B is set.

At this time, even when the release member 42 continuously rotates in a state where the separation is released, the bearing member 40 is set to be located at a position where the bearing member does not come into contact with the release member 42, and thus an ordinary usage state where the secondary transfer outer roller 20 abuts against the intermediate transfer belt 8 is set. When the separation is released, the amount of rotation of the separation member 41 is regulated by collision between the second curved portion 40a and the first curved surface 41a.

Also in this embodiment described above, substantially the same effects as in the first embodiment can be obtained.

Meanwhile, the first to third embodiments described above illustrate an example of the intermediate transfer belt unit 9 having the intermediate transfer belt 8. However, the present invention is not limited thereto, and can also be applied to a configuration of a direct transfer system that directly performs transfer to a recording medium from a photoconductive drum without going through the intermediate transfer belt 8. Further, it is possible to apply the present invention to a configuration including a primary transfer roller in an image forming apparatus having only a monochrome configuration.

In the first to third embodiments, four image forming portions 1Y, 1M, 1C, and 1Bk are used as process cartridges which are detachable from the apparatus main body 100a. However, the number of units is not limited thereto, and can be appropriately set on an as-needed basis.

In addition, the first to third embodiments illustrate a photoconductive drum, and a charging unit, a developing unit, and a cleaning unit as process units acting on the photoconductive drum, which are formed integrally with each other, as a process cartridge detachable from the apparatus main body 100a, but the present invention is not limited thereto. For example, it is also possible to configure a process cartridge in which a photoconductive drum is formed integrally with any one of a charging unit, a developing unit, and a cleaning unit.

Further, the first to third embodiments illustrate a configuration in which the process cartridge including the photoconductive drum is detachable from the apparatus main body 100a, but the present invention is not limited thereto. For example, an image forming apparatus in which a photoconductive drum and process units are embedded or an image forming apparatus in which a photoconductive drum and process units are detachable may be configured.

In addition, the first to third embodiments illustrate a printer as the image forming apparatus 100, but the present invention is not limited thereto. For example, other image forming apparatuses such as a copier and a facsimile machine, or other image forming apparatuses such as a multifunction machine having a combination of these functions may be used. Alternatively, an image forming apparatus may be used which uses a recording medium support and sequentially transfers various colors of toner images to a recording medium supported by the recording medium support in an overlapping manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-144165, filed on Jul. 10, 2013, which is hereby incorporated by reference herein in its entirety.

What is claimed is:

1. An image forming apparatus comprising:
   an image bearing member;
   an image forming unit configured to form a toner image on the image bearing member;
   a transfer roller configured to transfer a toner image from the image bearing member onto a recording medium;
   a bearing member configured to support the transfer roller;
   a bearing support member configured to movably support the bearing member;
   a biasing member disposed between the bearing support member and the bearing member, the biasing member being configured to bias the transfer roller toward the image bearing member;
   a separation member rotatably disposed in the bearing support member, the separation member being configured to move a position of the bearing member, the separation member being (i) engaged with a bearing side engagement portion of the bearing member in a separation state in which the transfer roller is separated from the image bearing member against a biasing force of the biasing member and (ii) released from the bearing side engagement portion in a contact state in which the transfer roller is contacted to the image bearing member with the biasing force;
   a conveyance roller configured to convey a recording medium;
   a drive source configured to drive the conveyance roller; and
   a release member configured to be driven by the drive source and to rotate independently from the rotation of the transfer roller, the release member having the separation member rotate in a predetermined direction from a first phase corresponding to the separation state to a second phase corresponding to the contact state by being driven by the drive source in the separation state and position the separation member in a position where the separation member is not rotated regardless of the rotation of the release member in the contact state.

2. The image forming apparatus according to claim 1, wherein the contact state is maintained regardless of driving of the release member.

3. The image forming apparatus according to claim 1, wherein the release member includes a releasing engagement portion that moves by the release member being driven, and wherein the separation member includes a released engagement portion engaging with the releasing engagement portion for rotating from the first phase to the second phase.

4. The image forming apparatus according to claim 2, wherein the release member includes a releasing engagement portion that moves by the release member being driven, and wherein the separation member includes a released engagement portion engaging with the releasing engagement portion for rotating from the first phase to the second phase.

5. The image forming apparatus according to claim 3, wherein the releasing engagement portion is configured in a claw shape, and the released engagement portion, which engages with the claw-shaped releasing engagement portion and rotates, is configured in an arm shape.

6. The image forming apparatus according to claim 3, wherein the releasing engagement portion is configured as a tooth portion of the release member having a gear shape, and the released engagement portion is configured as a chipped tooth gear portion of the separation member that meshes with the tooth portion.

7. The image forming apparatus according to claim 3, wherein the separation member includes a separation side engagement portion, and wherein the bearing side engagement portion engages with the separation side engagement portion in the separation state, the engagement with the separation side engagement portion being released when the separation member is at the second phase and then the bearing member is moved toward the image bearing member.

8. The image forming apparatus according to claim 7, wherein the separation side engagement portion includes a first engagement portion regulating the rotation of the separation member in the predetermined direction to the second phase without a rotation of the release member in the separation state by engaging with a supporting portion side engagement portion, and a second engagement portion that engages with the bearing side engagement portion in the separation state.

9. The image forming apparatus according to claim 8, wherein the bearing side engagement portion includes an arc-like guiding portion guiding the second engagement portion, and the bearing side engagement portion includes a notch portion configured to allow the second engagement portion of which the engagement with the bearing member is released to escape from the arc-like guiding portion moving by a biasing force of the biasing member when the separation member is in the second phase.

10. The image forming apparatus according to claim 8, wherein the first engagement portion is configured to be elastically deformed such that the first engagement portion moves over the supporting portion side engagement portion and releases the engagement with the supporting portion side engagement portion in response to the rotation of the separation member by the release member in the separation state.

11. The image forming apparatus according to claim 7, wherein the separation side engagement portion includes a first curved surface centered on a rotation center thereof, and wherein the bearing side engagement portion includes a second curved portion which engages with the first curved surface in a separation state and which is curved to allow the rotation of the separation side engagement portion.

12. The image forming apparatus according to claim 1, wherein the image bearing member is an intermediate transfer belt.

* * * * *